Figures 1, 2, 3:
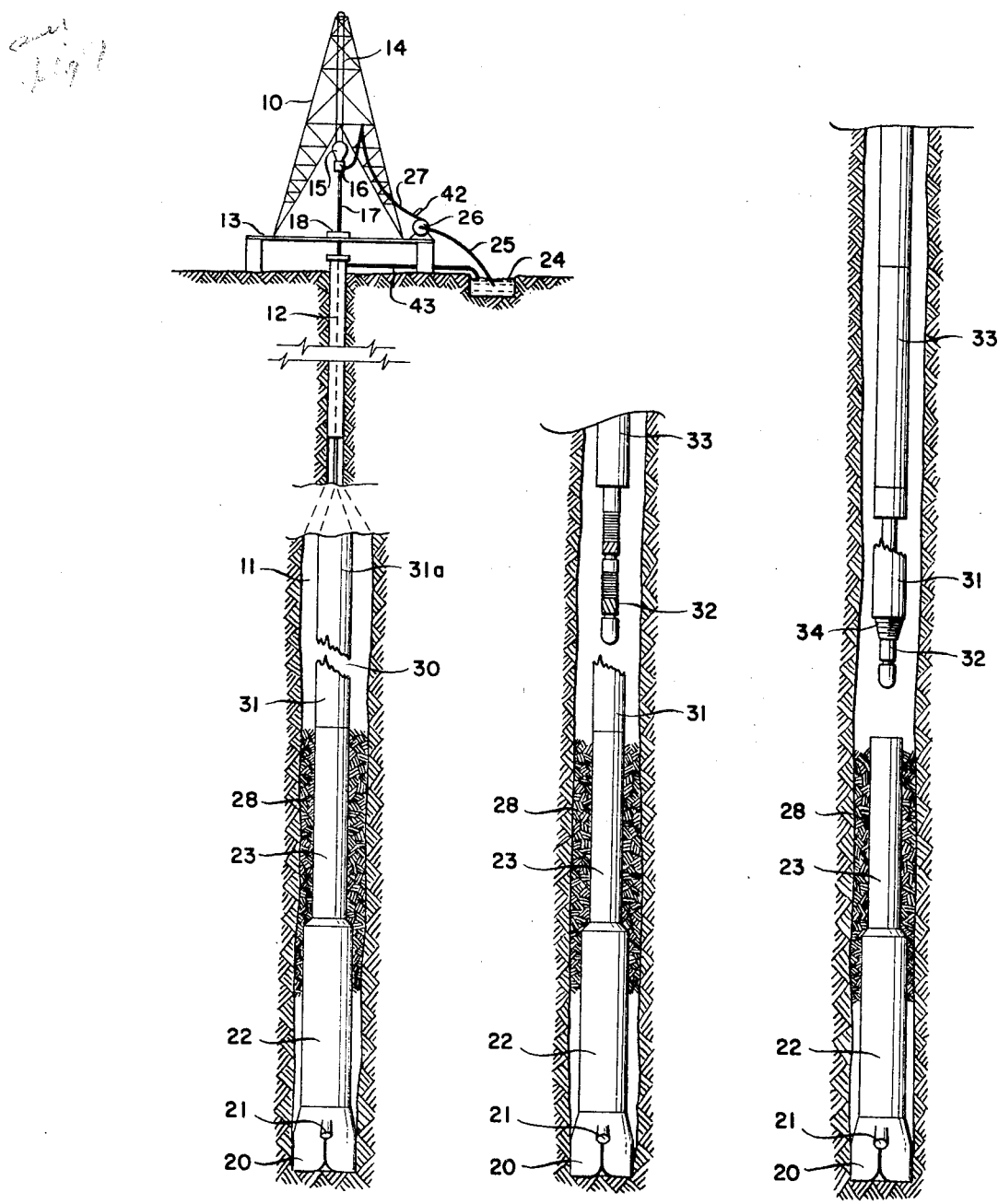

Aug. 23, 1966   R. L. ESSARY   3,268,003
METHOD OF RELEASING STUCK PIPE FROM WELLS
Filed Sept. 18, 1963                         2 Sheets-Sheet 1

INVENTOR:
ROY L. ESSARY
BY: A. H. McCarthy
HIS AGENT

Aug. 23, 1966   R. L. ESSARY   3,268,003
METHOD OF RELEASING STUCK PIPE FROM WELLS
Filed Sept. 18, 1963                2 Sheets-Sheet 2
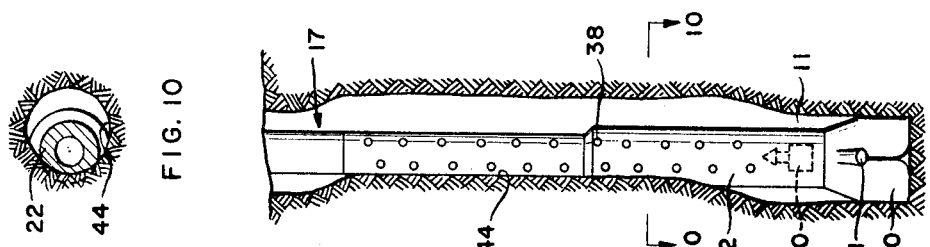
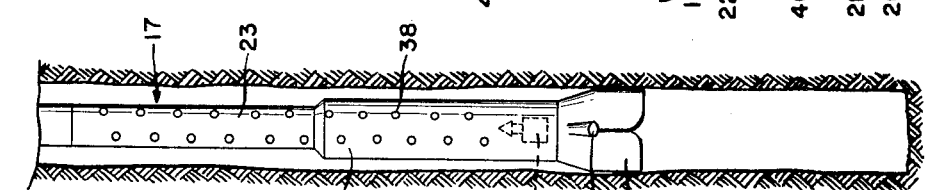
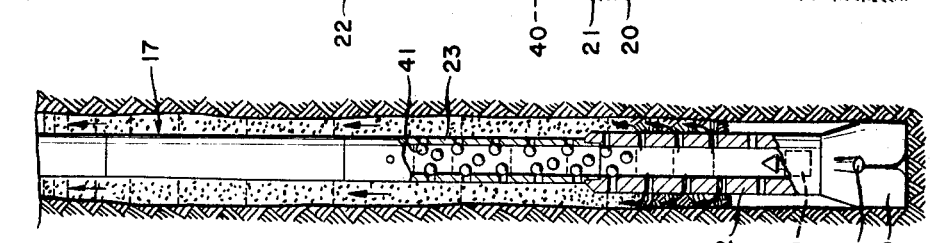
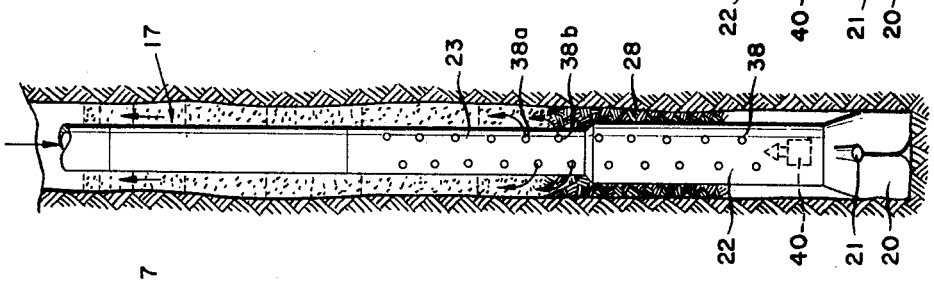
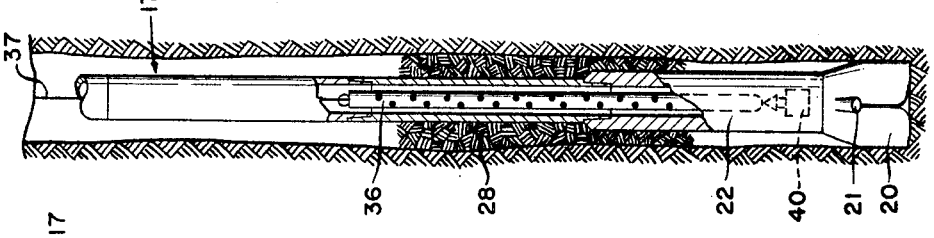
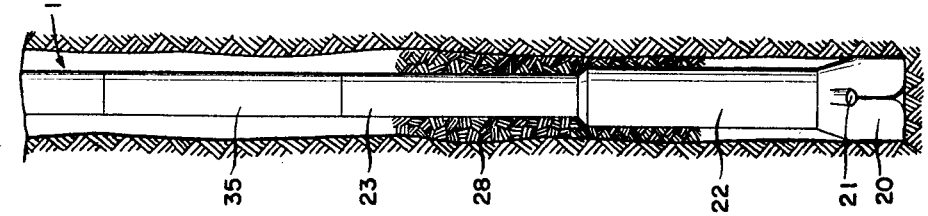
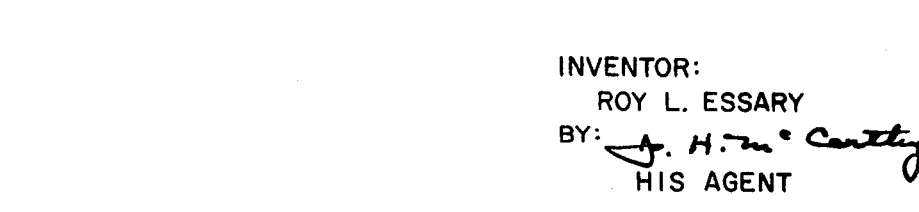
INVENTOR:
ROY L. ESSARY
BY: J. H. McCarthy
HIS AGENT United States Patent Office 3,268,003
Patented August 23, 1966

3,268,003
METHOD OF RELEASING STUCK PIPE FROM WELLS
Roy L. Essary, Midland, Tex., assignor to Shell Oil Company, New York, N.Y., a corporation of Delaware
Filed Sept. 18, 1963, Ser. No. 309,644
2 Claims. (Cl. 166—35)

This invention relates to a method for carrying out certain remedial operations during well drilling, completion or work-over operations and pertains more particularly to a method for freeing and recovering any tubular fish which has been become stuck in a borehole due to caving in of some of the formation which forms the well wall or due to the settling of earth particles around a drill string when mud circulation has been discontinued for a considerable length of time. The method of the present invention also pertains to freeing drill pipe or any tubular device or apparatus which is stuck in a borehole due to a pressure differential existing between the hydrostatic pressure of the mud column in the well and the formation pressure.

A pressure differential may often exist in a well, particularly when the well or borehole is drilled through a depleted reservoir having a low formation pressure. For example, in one well, the pressure differential was found to be in the order of 2400 p.s.i. in a particular zone of the well at a depth at about 5100 feet where a pipe or fish had become stuck. A "fish," as used in oil field terminology, is generally defined as a section of pipe, an instrument, device or other piece of apparatus which may have become lost or stuck within a well. In order to recover a fish, it is necessary to carry out fishing operations within the well by any of the many methods well known to the art. One conventional method of recovering a fish is known as the wash-over method wherein a large diameter pipe known as the wash pipe is lowered in the well and washed over the upper section or the top of a fish stuck in the well. The section of fish that has been freed by washing is then unscrewed from the remainder of the fish in the well and raised to the surface. Subsequently, the next section of the fish may be washed over and recovered in a like manner and this operation is continued until all of the fish has been recovered. In the washing-over method, the large diameter of the wash pipe makes it an undesirable tool to run into many wells due to the danger of the wash pipe becoming stuck together with the fish. In many cases, it is impossible to work the wash pipe down to the fish.

In another method of recovering a fish, a volume of oil is circulated down the well and spotted adjacent to the fish while the fish is jarred through a connection with a pipe string. This method can only be used if the well borehole is open sufficiently to spot the oil in place. This method has proved unsatisfactory in many instances as oil spotting normally requires a considerable amount of costly "rig time," not only to soak and jar the fish, but also to return the drilling mud in the borehole to a suitable uncontaminated condition required for reservoir content interpretation tests.

Accordingly, an object of the present invention is to provide a new and improved method for overcoming these and other deficiencies of presently known fishing techniques so as to free and/or recover drill pipe and the like which is stuck in a borehole due to a pressure differential between the hydrostatic pressure of the mud column in the borehole and the formation pressure.

A further object of the present invention is to provide a method of freeing a drill pipe or fish which has become stuck within a well borehole due to particles of earth formations becoming lodged in a relatively solid mass within the well so as to form a plug bridging the annular space between the outside surface of a pipe or other object and the wall of the well.

Another object of the present invention is to provide means of washing away earth particles which have accumulated outside a pipe section without the necessity of lowering a larger-diameter pipe to wash or cut away the particles.

Still another object of the present invention is to provide a method of freeing a pipe which has become stuck in a well due to differential pressure by substantially equalizing the pressure in the formation to that of the well at a desired level so that a fish can readily be moved.

These and other objects of this invention will be understood from the following description taken with reference to the drawing, wherein:

FIGURE 1 is a schematic view diagrammatically illustrating a drilling assembly positioned over a well where drilling operations are being carried out and wherein the well is shown in the longitudinal cross section so as to illustrate a section of the drill pipe becoming stuck due to earth particles which have formed a plug around the drill pipe;

FIGURES 2 through 8 are diagrammatic views taken in longitudinal cross section of the lower portion of the well of FIGURE 1, said views illustrating sequentially the steps of removing a broken section of pipe from the top of the fish (FIGURES 2 and 3), establishing a hydraulically-sealed connection between the top of the fish and the lower end of another pipe string (FIGURE 4), lowering a perforating tool to a position inside the stuck portion of the fish (FIGURE 5), circulating fluid down the pipe to wash away the earth plug formed around it (FIGURES 6 and 7), and withdrawing the freed fish and pipe string from the well (FIGURE 8);

FIGURE 9 is a diagrammatic view taken in longitudinal cross section of a drill string stuck within a well due to a pressure differential existing therein; and FIGURE 10 is a plan view, taken in cross section along the line 10—10 of FIGURE 9.

Referring to FIGURE 1 of the drawing, a well drilling derrick 10 is shown as being positioned for drilling a well 11, the upper end of which may be cased by a foundation casing 12 which is normally cemented in place. The derrick 10 and its operating platform 13 are provided with conventional auxiliary drilling equipment such for example as fall lines 14 carrying traveling block 15 and swivel 16 which in turn support a drill string 17 which is rotated by a rotary table 18. A drill bit 20 having fluid circulation ports or jet nozzles 21 is secured to the lower end of the drill string 17. One or more drill collars 22 may be positioned near the lower end of the drill string while a normal drill pipe section 23 may be secured above collar or collars 22. Drill collars are normally thick-walled drill pipe.

During drilling operations, drilling mud is withdrawn from a mud pit 24 at the surface by means of a conduit 25 connected to the suction end of a pump 26. The discharge end of the pump 26 is connected to the swivel 16 through a flexible conduit 27 so that drilling mud can be circulated down through the drill string 17 out the ports 21 of the bit 20 and up the annular space outside the drill string 17.

FIGURE 1 of the drawing illustrates a condition where some of the earth formation forming the walls of the well 11 has fallen off and down the well to form a plug of earth particles 28 which bridge the space between the drill pipe 23 and the wall of the well. A drill string is made up of a plurality of pipe sections connected end-to-end to form an elongated tubular member extending through the well. Continued rotation after the lower end of the drill pipe becomes stuck may cause the upper free portion of the drill string 17 to twist off, as at 30, leaving the lower end of a 30-foot section of drill pipe 31 at the top of the fish which consists of the drill string stuck in the well.

In FIGURE 2, an operation is illustrated wherein a fishing tool, such as a spear 32 of any suitable type, is lowered into the well by means of a running pipe string 33 and stabbed into the bore of the broken off pipe section 31. In FIGURE 3, the running pipe string 33 and spear 32 is being withdrawn from the well together with a broken section of pipe 31 which has been backed out of the next lower pipe section 23 by left hand rotation. In some instances it may be necessary to explode a small shot charge within the pipe string opposite the threaded pipe joint 34 prior to unscrewing it from the pipe section 23. This may be done in any conventional manner well known to the art. The main reason for removing the broken section of the pipe 31 is that it would be difficult to obtain or establish a hydraulically-sealed connection with the upper end of the section 31 because of its jagged nature. However, it is to be understood that instead of removing the broken pipe section 31, in many instances a pipe cutter may be used to cut off the jagged upper end or a milling tool of any conventional type may be used to mill off the jagged upper portion to a smooth surface against which a hydraulically-sealed connection may be obtained.

In FIGURE 4, after removing the twisted off section 31 (FIGURE 3) from the bottom of the drill string 17, the drill string 17 is again run into the well so that its lower threaded end of the lowermost pipe section 35 can be screwed into the top of the uppermost pipe section 23 stuck in the well.

At this point it is necessary to determine accurately the location of the top of the stuck portion of the pipe in the well. Although for ease of illustration, the plug 28 of earth particles is shown as being positioned opposite the uppermost pipe section 23 to which the pipe section 25 was just connected, it is to be understood that there may be several hundred feet of pipe between the top of the plug 28 and the point at which the drill pipe 17 twisted off, as described with regard to FIGURE 1. The location of the first section 23 of stuck drill pipe is determined by locating the lowermost section 35 of drill pipe that is not stuck. This operation is carried out in a conventional manner by apparatus well known to the art. Free-point indicators for pipe are supplied by various companies such as The Dia-Log Company, Houston Oil Field Material Co., Inc., and McCullough Tool Company, which apparatus and methods of using them are described in Composite Catalog of Oil Field Equipment and Services, pages 1587, 2468 and 3217, respectively in the 1962–63 edition, published by World Oil. In general, a free-point indicator consists of a magnetic, electric or elecronic probe such as an electronic strain gauge which is run through the drill pipe 17 a short distance at a time. At selected points along the pipe string 17, tension, compression or torque is applied to the pipe from the surface causing a change in the reading of the indicator attached to the probe. When no change takes place while stressing the pipe this indicates that the probe is below the "free" point and inside the stuck portion.

After accurately determining the position of the top of the earth plug 28, a perforator 36 of any suitable type well known to the art is lowered on a wire line 37 through the pipe 17 to a position opposite and extending slightly above the plug 28. The perforator is then fired and the stuck tubular string is perforated with a jet or bullet perforator which has a number of jet charges or bullets, arranged one above another over a substantial vertical distance, which are preferably discharged in various directions. Preferably, the perforations 38 (FIGURE 6) are arranged in a somewhat helical pattern throughout a substantial portion of the stuck section of drill pipe. While it is desirable to perforate the section of stuck drill pipe from a point at the top or just above the top of the plug 28 to a point opposite the bottom of the plug 28, this is not always possible since the bottom of the plug 28 may not be determinable. It is sufficient, however, that at least a stuck section of drill pipe opposite the top of the plug 28 be perforated at least in the beginning of the present method of removing a stuck fish from a well. In many cases, it will probably be necessary to perforate a number of shorter intervals sequentially, beginning at the bottom to cover the desired interval.

After removing the perforator 36 from the drill pipe 17, a fluid such as water, oil or drilling mud or even gas, is pumped down through the drill string 17 from the surface by means of pump 26 (FIGURE 1). As shown in FIGURE 6, the drill fluid or other circulating fluid being pumped down through pipe string 17 is discharged through the uppermost perforations 38a and 38b above or near the top of the plug 28. The jetting fluid coming out of the perforations disintegrates the plug of earth particles starting from the top and working downward, and washes the particles up the space between the drill string 17 and the borehole wall of the well. In some circumstances it may be desirable to drop a retrievable plug 40 to the bottom of the drill string 17 prior to perforating in order to close the jet ports 21 and the bit 20, thus preventing fluid from being jetted in to the adjacent formation below the plug 28 in the event that such a formation existed which would receive the fluid.

It is quite apparent that as the fluid is pumped down the pipe 17 it will be discharged through the perforations 38 which are above the plug of earth particles 28 and will not further disturb the plug 28 unless perforation-blocking elements are positioned in a manner to close or substantially close the fully opened perforations which are positioned above the level of the earth plug 28. Thus, in order to close the fully opened perforations in the perforated section of the fish 23, a plurality of perforation-blocking elements in the form of balls 41 are added to or injected into the flow stream coming down the pipe string 17. The flow-restricting elements or balls 41 preferably have approximately the same specific gravity (or apparent specific gravity) as that of the fluid being pumped down the pipe 17 in order that the balls 41 flow with the fluid rather than merely float or sink rapidly through it.

As the perforation-blocking or flow-restricting elements 41 approach the section of drill pipe or fish having the perforations 38 therein, the flow-restricting elements 41 are carried along by the stream of fluid being discharged through one or more perforations 38 at the top of, or above, the earth bridge 28. The flow-restricting elements 41 seat against the open perforations, as shown in FIGURE 7, where the earth plug has been removed thus closing these perforations 28 and causing the rest of the fluid to flow downwardly in the pipe and be discharged through the next lowermost perforations having particles or earth formation still forming a plug outside these perforations.

As each of the balls 41 seats against one of the perforations 38, a pressure rise in the fluid stream may be noted at the surface, as on a pressure gauge (not shown) in the discharge conduit from the pump 26, for example. The pressure rise is a result of the decrease in the rate of passage of fluid through the perforations, assuming that the same horsepower is applied to the pump 26 before and after the ball seats. As soon as the earth particles are washed away from the drill pipe outside the perforations, the pressure will drop again. At other times if the earth plug 28 outside the pipe is relatively loosely consolidated, no pressure rise or drop will be noted during the operation as the jetting fluid is able to wash away the earth plug quite rapidly.

It is important that, as the earth plug 28 is washed away from top to bottom and circulated up the annular space outside the drill pipe 17 and out of the well, the uppermost perforations remain sealed or plugged. Therefore, throughout the operation after the first of the perforations have been plugged, a differential pressure is maintained across the perforations with a higher pressure in the drill pipe or fish than outside so that the sealing or bridging elements plugging the perforations are held in position within the drill pipe against the perforations. The pressure on the inside of the drill pipe at the elevation of the perforation should be greater than the external hydrostatic or other pressure so that there is no tendency for fluid to flow into the pipe and displace the sealing elements or balls 41 up the pipe or off the perforations.

Even though the prime application of this procedure is to free stuck drill pipe, the method is also readily applicable to other tubular goods such as tubing or casing that may be similarly stuck in open hole intervals. For instance, while running casing, the casing may become stuck; then a bridge plug may be placed in the bottom of the casing string and the procedure used to free the casing rather than cutting it off and trying to remove the resulting fish. Of course this would require pulling the casing and removing the perforated section before rerunning.

The flow-restricting, bridging or perforation-blocking elements or balls 41 may be made of such materials as nylon, aluminum, magnesium, bronze, steel or plastic or other material of suitable apparent specific gravity and capable of withstanding the pressures encountered without excessive deformation. Preferably, the balls 41 are made of rubber stiff enough so that they cannot be forced under pressure through the perforations. The density of the balls may be readily altered by adding metallic particles to the rubber during manufacture or by any other suitable method well known to the art. Thus, balls having a density substantially equal to that of the fluid being used may be selected prior to carrying out the method of the present invention. Metallic balls 41 may be of solid granules or particles sintered or partly fused together to make an impermeable or permeable ball 41. In some cases, it may be desirable to employ balls which permit the passage of a small amount of fluid therethrough or therearound while seated in position against a perforation. Fluid could pass around the exterior of the balls if the outer surface was rough or channeled. It is sometimes advantageous to have a resilient coating or layer on the surface of the balls to assure proper seating of metallic balls with respect to the perforation.

The size of the perforation-closing elements or balls 41 is of some importance. They must, of course, be of larger diameter than the diameter of the perforations 38. For ⅜ inch perforations, blocking elements 41 having a nominal ¾ inch diameter have proven to be satisfactory although elements of other diametrical measurement may be used with such perforations. The ¾ inch flow-restricting balls seat well with a ⅜ inch perforation yet are large enough so that they resist being driven through the perforation 38.

The balls are added to the flow stream on the discharge side of the pump 26 through any suitable ball injection device 42 (FIGURE 1) well known to the art. The number of balls and the spacing of the balls in the flow stream can be determined after some experience with various types of earth plugs causing stuck drill pipe. The rate at which the balls 41 are added to the fluid stream being pumped down the well depends upon the number of perforations in the fish, the size of the perforation, the pump pressure and the rate at which the earth plug is being washed from the outside of the fish. The perforations are arranged in a preferably helical configuration in the wall of the fish so as not to unduly weaken the fish in a manner such that a substantial tension being applied to the fish through the circulating pipe string would cause the fish to pull apart at any single row of perforations. The perforations may be spaced, say, about 4 or 6 inches from each other along the vertical axis of the pipe, or at any other spacing arrangement found to be adequate depending upon the conditions encountered. It is understood that generally no perforations would be attempted through the tool joints of a drill string. The rate at which the balls are added to the fluid stream will determine the rate at which the earth plug 28 is washed away. This rate may be in the order of one foot of plug washed away for each ten barrels of fluid jetted through the perforation. It may take in the order of ten barrels of liquid being circulated per minute to lift the cuttings off the plug 28 and out of the well, the cuttings being discharged through discharge pipe 43 into the pit 24 or caught on a shale shaker. The balls 41 may be added singly or in groups. The number of balls to be added should total a few less than the total number of perforations in the fish.

While the method of the present invention has been described with regard to first removing the upper end sections 31 of the broken fish, as shown in FIGURES 1 and 2, it is to be understood that bridging of the annular space between the drill pipe 17 (FIGURE 3) and the wall of the borehole (FIGURE 4) may take place without the drill string breaking off. Thus, the drill string which already extends to the surface would provide a sealed fluid flow connection between the stuck tubular member opposite the earth plug 28 and the top of the well. The lowermost free point of the drill pipe 17 or the upper point in the well where the drill pipe was stuck could then be determined by a method described hereinabove in order to determine the section of pipe to be perforated.

In the event that an extremely long section of pipe is stuck, say 200 feet or more, it may be preferred to free the upper end of the stuck section in the manner of the present invention, that is, by perforating and flushing the earth plug away from the upper section. Subsequently, the lower section of stuck pipe would then be perforated and the plug flushed away by a continuation of the method described hereinabove. Alternatively, after the upper portion of the stuck section of the drill string was perforated and flushed free, it could be removed by backing off the pipe string above the last free joint and withdrawing the drill string to the surface, disconnecting the perforated sections of pipe and then running the drill string back into the well to establish fluid communication with the rest of the stuck section left in the well. This section could then be perforated and flushed free by the present method. After the plug was entirely removed the drill string would be withdrawn together with the bit as shown in FIGURE 8. If practicable, instead of using plug 40 in the bottom of the drill string, some of the balls 41 may be employed to close the openings in the bit.

From time to time during the practice of the method of the present invention, tension may be applied axially to the drill pipe extending to the surface or to the tubular member secured to the fish in order to attempt to pull the fish free when sufficient amount of the plug 28 has been flushed away. Alternatively or simultaneously, the drill string may be jarred from time to time in an attempt to free it. Tension would be applied to the pipe by means of the hoist system of the derrick at the surface. If desired, an attempt may be made from time to time to rotate the drill string being flushed free.

While the method of the present invention has been described hereinabove mainly with regard to a drill pipe or fish being stuck in a well through the formation of a bridge of earth particles, it is to be understood that the method of the present invention is especially useful in freeing drill pipe or a fish which has been stuck in a well due to differential pressure between the mud column in the well and a particular formation. As shown in FIGURE 9, a portion of the well 11 may be deviated from the vertical over an interval or may be drilled in a slanting manner so that the bit or centralizers on the drill pipe do not hold it free of the adjacent well wall, as at 44, thus providing a chance for a differential pressure to act against the pipe and stick it against the well wall. In such a case the method of the present invention would be carried out in much the same manner as that described hereinabove except that, after perforating the desired section of drill pipe, a much larger number of perforation-blocking elements or balls 41 would have to be added, preferably at one time, to the fluid flow stream passing down the well in order to close all of the open perforations in the perforated section of the drill pipe. Thus, continued pumping of fluid down the drill pipe will cause the fluid to be discharged against the borehole wall 44 in contact with the drill pipe 17. Either sufficient material can be flushed from the borehole wall to permit well fluid to surround the drill pipe and break the differential seal between the pipe and the borehole wall, or fluid under pressure could be pumped into the adjacent low pressure formation 44 to create a counteracting supercharged condition within the formation itself since the formation cannot dissipate the fluid as rapidly as it is being pumped into the formation. Thus, the pressure in the formation will be built up until it equals that of the borehole and the differential seal between the drill pipe and borehole wall was broken, thus freeing the drill pipe or fish. At times, with broken fish as shown in FIGURE 1, it may be necessary to clean any debris out of the fish before lowering a perforating gun therein. Debris may be in the form of earth cuttings and may be removed by means of a bailer of any conventional well known design, or may be flushed out by a small-diameter pipe lowered into the fish for pumping in some liquid in and out thereof.

I claim as my invention:

1. A method freeing for movement within a well a tubular member stuck against the wall of the well by a pressure differential between the mud column hydrostatic pressure in the well and the formation pressure at the stuck point, said method comprising the steps of:

providing a sealed fluid flow connection between the stuck tubular member and the top of the well, determining the upper point in the well where the tubular member is stuck, perforating a selected length of said tubular member below its uppermost stuck point, said perforating taking place at least in the direction of the portion of well wall against which said tubular member is stuck, pumping fluid down said fluid flow connection and into said tubular member and out the perforations therein to be discharged at a pressure above the hydrostatic pressure of said mud column within the well at that point, injecting said fluid into the formation until the fluid pressure within the formation is substantially at least equal to the fluid pressure within the borehole at that point, adding to said fluid being pumped down the tubular member and into the fish, perforation blocking elements of a size and configuration and specific gravity to become lodged against those perforations through which a disproportionately large amount of said fluid is passing and at least partly blocking said perforations to limit the flow therethrough and divert a major portion of the fluid flow to other perforations, and subsequently, moving said tubular member after the fluid being discharged from said perforations has pushed it away from the well wall.

2. The method of claim 1 including the step of blocking the bore of said tubular member below the perforations therein prior to pumping fluid through said perforations.

References Cited by the Examiner

UNITED STATES PATENTS 1,557,480 10/1925 Plante _____ 166—98
3,191,683 6/1965 Alexander _____ 166—46

CHARLES E. O'CONNELL, *Primary Examiner.*

J. A. LEPPINK, *Assistant Examiner.*